United States Patent

[11] 3,617,849

| [72] | Inventor | Robert L. Charlton<br>Earlysville, Va. |
|---|---|---|
| [21] | Appl. No. | 64,543 |
| [22] | Filed | Aug. 14, 1970 |
| [45] | Patented | Nov. 2, 1971 |
| [73] | Assignee | Teledyne, Inc.<br>Los Angeles, Calif. |

[54] MOTOR CONTROL DAMPING CIRCUIT
7 Claims, 5 Drawing Figs.

| [52] | U.S. Cl. | 318/616,<br>318/663 |
|---|---|---|
| [51] | Int. Cl. | G05b 5/01 |
| [50] | Field of Search | 318/616,<br>621, 663 |

[56] References Cited

UNITED STATES PATENTS

| 2,671,876 | 3/1954 | Spielberg et al. | 318/616 |
|---|---|---|---|
| 2,913,649 | 11/1959 | McKenney et al. | 318/616 X |
| 3,167,697 | 1/1965 | Anderson | 318/616 |
| 3,171,954 | 3/1965 | Stern | 318/616 X |
| 3,239,733 | 3/1966 | Sikorra | 318/616 |

Primary Examiner—T. E. Lynch

ABSTRACT: The circuit controlling the motor which actuates a control potentiometer or the like is made up of operational amplifiers and resistors connected so that, at stall, the feedback loop is not effective and the feedback loop is effective only when the motor is turning, which provides the desired rate feedback for servo damping.

INVENTOR

Robert L. Charlton a = FRACTIONAL PART OF Rp IN CIRCUIT - VARIES FROM 0 TO 1.

MOTOR CONTROL DAMPING CIRCUIT

In prior methods for obtaining rate feedback for controlling motors driving potentiometer wipers or other means the number of electrical components required has been greater than in my circuits, and, in addition, my improved rate feedback system provides more reliable and smoother control of the potentiometer drive motor.

It is an object to provide a rate feedback circuit or system for closely controlling motors which drive potentiometer wipers or for other applications.

Another object is to provide suitable damping for motors driving potentiometer wipers or the equivalent. Of course the potentiometer wiper could be stationary and the winding or resistor element of the potentiometer could be shifted.

A further object is to provide a reliable motor-damping system or circuit which is relatively simple.

Other objects will be evident in the following description.

Figure 1:
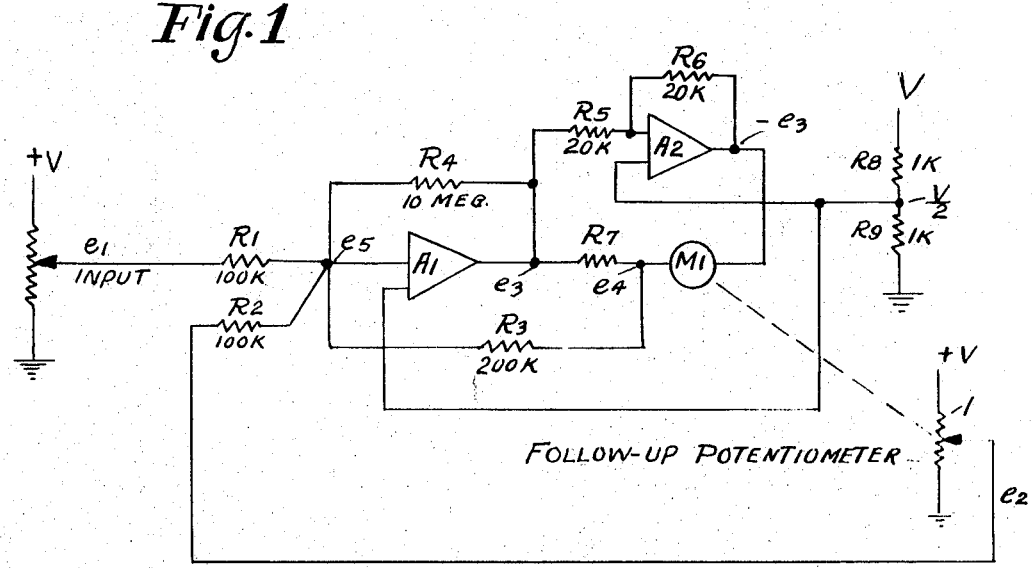
FIG. 1 illustrates my improved motor drive with rate damping.

In FIG. 1, showing my improved servoamplifier circuit, voltage $e_2$ is the followup voltage and voltage $e_1$ is the input voltage. Amplifier $A_1$ sums voltage $e_1$ and $e_2$ and voltage $e_3$ is the amplified servo error. The followup potentiometer 1 is mechanically connected to the DC motor $M_1$ in such manner that the amplified error voltage $e_3$ causes the motor to rotate followup potentiometer 1 to reduce the servo error. Rotation of the motor feeds the back E.M.F. $e_4$ of the motor to the summing junction $E_5$ of amplifier $A_1$ for rate damping.

Figure 2:
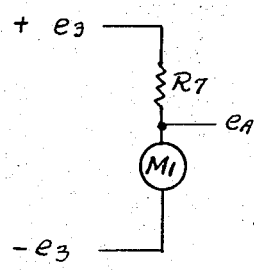
FIG. 2 shows a fragmentary portion of the circuit, including the motor and connected resistor.

The rate feedback circuit is believed to be novel, as explained below. Referring to FIG. 2, by making the resistor $R_7$ exactly equal to the armature resistance of the motor, and during the interval before the motor starts to turn, the voltage $e_4$ is precisely equal to the summing junction voltage $3_5$ or one-half of voltage V supplied to differential amplifier $A_1$, as shown in FIG. 1.

Thus, at stall, the feedback loop including resistor $R_3$ is not effective. This is another way of saying that this feedback loop is effective only when the motor is turning, which provides the desired rate feedback for servo damping. At stall the voltage $E_4$ is half the supply voltage. This is an important condition.

Operational amplifier $A_1$ provides voltage gain for reducing the servo deadband and operational amplifier $A_2$ exactly inverts the voltage $e_3$ so that the rate feedback bridge including resistor $R_7$ and Motor $M_1$ functions properly. This circuit is superior to the conventional circuitry for obtaining rate feedback since only one series component is required to obtain the rate feedback.

Figure 3:
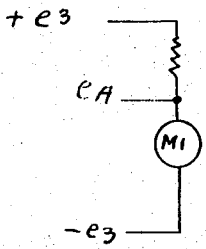
FIG. 3 shows fragmentary circuit including the components of FIG. 2 but producing a different potential across the motor.
Figure 4:
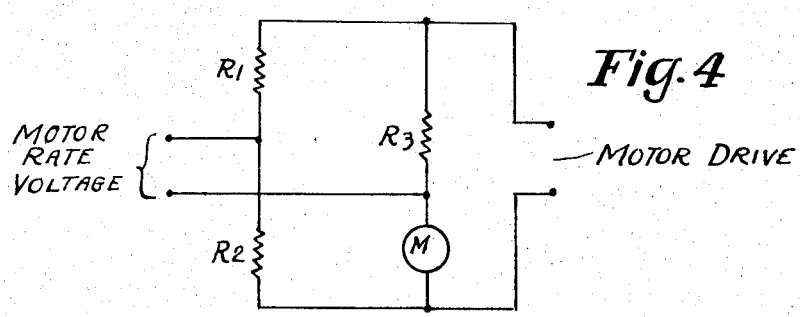
FIG. 4 shows a prior circuit arrangement showing the greater number of electrical components necessary in order to approximate the results achieved by applicant's simple partial circuits of FIGS. 2 and 3.

My new circuit for obtaining rate feedback is shown in FIG. 3 and the old, conventional circuit for this purpose is shown in FIG. 4. It is obvious that the conventional circuitry is considerably more complicated than my new, improved circuit illustrated in FIG. 3. Temperature stability can be obtained in my circuit by making the resistance of element $R_7$ equal to the armature resistance of motor $M_1$. At stall $e_4$ is equal to $e_5$.

The values of components shown in the circuits are not to be considered as exclusive but are indicated as typical values. The invention contemplates two important considerations, however. First, the resistance of resistor $R_7$ should be equal to the resistance of the armature of motor $M_1$ and, secondly, the ratio of resistance of element $R_6$ to that of element $R_5$ should be 1. The resistance of element $R_3$ can be chosen to control the damping ratio.

Figure 5:
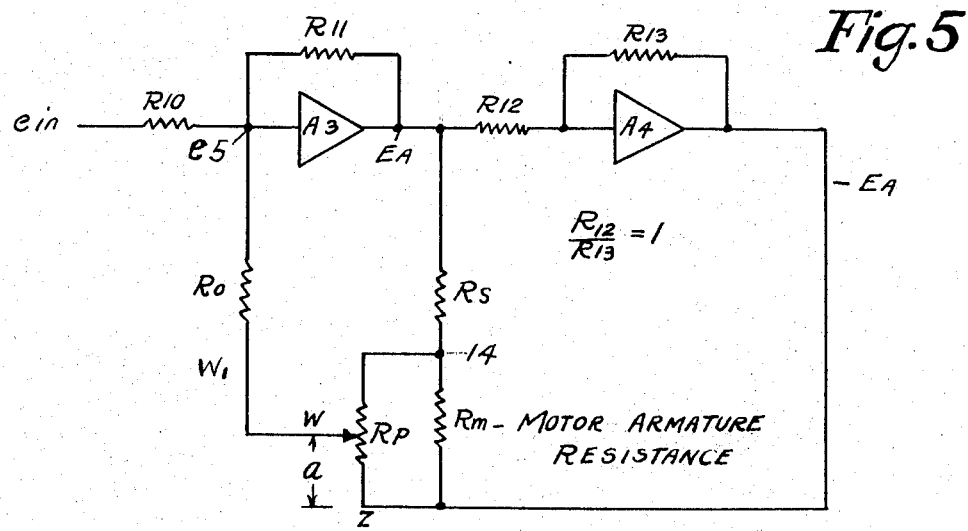
FIG. 5 is a circuit illustrating particularly the novel features of my invention.

The circuit shown in FIG. 5 illustrates clearly general principles underlying my invention and the related analysis below is provided to clarify any uncertainties regarding the principles of operation of the circuitry.

Under stall conditions, the static voltage gain $E_A/e_{in}$ is given by the equation $$\frac{E_A}{e_{in}} = \frac{-\frac{R_{11}}{R_{10}}}{1+\frac{R_{11}}{R_0}\left[\frac{2a}{\frac{R_S}{R_P}+\frac{R_S}{R_M}+1}-1\right]} \quad (1)$$

where "a" is equal to the proportional resistance between potentiometer wiper or slide W and point Z as compared to the total potentiometer resistance $R_P$, and $R_M$ represents the armature resistance of the motor. For proper circuit alignment the term $$\frac{2a}{\frac{R_S}{R_P}+\frac{R_S}{R_M}+1}=1$$

should equal 1. Thus the circuit gain is simply the ratio $R_{11}/R_{10}$ which means that the feedback loop including resistor $R_0$ is only active for rate feedback.

When $a=1$, $R_S=R_M$ and $R_P \to \infty$ (on open circuit). Then $$\frac{E_A}{e_{in}} = \frac{-\frac{R_{11}}{R_{10}}}{1+\frac{R_{11}}{R_0}\left[\frac{2}{1+1}-1\right]} = \frac{R_{11}}{R_{10}}$$

which is the simplified circuit equation of FIG. 1.

When components are chosen so that $$\frac{2a}{\frac{R_S}{R_P}+\frac{R_S}{R_M}+1} = 1$$

the circuit gain $E_A/e_{in}$ is determined by resistors $R_{11}/R_{10}$. It may be desirable to increase this gain by adding positive feedback which would cause the motor to dither and break the static friction of the gear train. For example if the denominator of equation (1) is made less than 1 by component selection the gain will be increased proportionally, resulting in a low-level motor oscillation which serves to reduce the static gear train friction.

Referring to the circuit of FIG. 5, by adjusting potentiometer $R_P$ the servo deadband can be selected. This circuit represents essentially the novel features of my invention. The voltage $e_5$ at the summing junction shown is comparable to that at junction $e_5$ of FIG. 1. If, in the circuit shown in FIG. 5, the resistance of element $R_S$ is equal to the resistance of the motor armature $R_m$, and if the resistance of element $R_{12}$ is equal to the resistance of element $R_{13}$, then the potentiometer resistor $R_P$ can be eliminated and conductor $W_1$ can be connected directly to junction 14. If the circuit of FIG. 5 is employed as shown the resistance of element $R_S$ should be less than the motor armature resistance. With my improved circuit only one takeoff at the motor feeds operational amplifier $A_3$ and the voltage at $e_5$ is always equal to half the supply voltage V. The voltage at $e_5$ stays steady at V/2 whereas the equivalent voltage in FIG. 4 does not.

The amplifiers $A_3$ and $A_4$, connected as shown, are preferably integrated circuit operational amplifiers.

What I claim is:

1. In a motor control circuit for providing rate damping of said motor, a first operational amplifier and a second operational amplifier connected in series therewith, a series connected first resistor in the input of said first amplifier and a second resistor connected in parallel with said first amplifier, a third resistor connecting the output of said first amplifier with the input of said second amplifier, a fourth resistor connected in parallel with said second operational amplifier, the ratio of the resistance of said fourth resistor to the resistance of said third resistor being one, a fifth resistor connected with the output of said first amplifier and in series with the armature of said motor which is connected to the output of said second amplifier, and a sixth resistor electrically connecting the input of said first operational amplifier with the junction of said motor armature and said fifth resistor.

2. The motor control circuit as described in claim 1, the ratio of the resistance of said fifth resistor to the resistance of said armature being one.

3. The motor control circuit as described in claim 1, and including a variable resistance connecting said sixth resistor with said motor armature.

4. The motor control circuit as described in claim 1, and including a potentiometer connected in parallel with said motor armature and connected with said sixth resistor.

5. The motor control circuit as described in claim 1, the ratio of the resistance of said second resistor to the resistance of said first resistor being, optionally, from one to 1,000.

6. The motor control circuit as described in claim 3, the resistance of said fifth resistor being less than the resistance of said motor armature.

* * * * *